United States Patent
Natanzon et al.

(10) Patent No.: US 10,581,897 B1
(45) Date of Patent: Mar. 3, 2020

(54) METHOD AND SYSTEM FOR IMPLEMENTING THREAT INTELLIGENCE AS A SERVICE

(71) Applicant: EMC IP Holding Company LLC, Hopkinton, MA (US)

(72) Inventors: Assaf Natanzon, Tel Aviv (IL); Amit Lieberman, Kefar Sava (IL); Oron Golan, Meitar (IL); Yuri Manusov, Beer Sheba (IL); Raul Shnier, Kibbutz Ruhama (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 189 days.

(21) Appl. No.: 15/660,259

(22) Filed: Jul. 26, 2017

(51) Int. Cl.
*H04L 29/06* (2006.01)
*G06F 21/56* (2013.01)
*G06F 11/14* (2006.01)

(52) U.S. Cl.
CPC ...... *H04L 63/1441* (2013.01); *G06F 11/1464* (2013.01); *G06F 21/564* (2013.01); *G06F 21/568* (2013.01); *H04L 63/1416* (2013.01); *G06F 2201/84* (2013.01); *G06F 2221/033* (2013.01)

(58) Field of Classification Search
CPC ............. H04L 63/1441; H04L 63/1416; G06F 11/1464; G06F 21/568; G06F 21/564; G06F 2201/84; G06F 2221/033
See application file for complete search history.

(56) References Cited

U.S. PATENT DOCUMENTS

| 8,978,141 | B2 | 3/2015 | Eliseev | |
|---|---|---|---|---|
| 9,235,632 | B1* | 1/2016 | Natanzon | G06F 11/2074 |
| 9,389,800 | B1* | 7/2016 | Natanzon | G06F 3/065 |
| 2005/0187740 | A1 | 8/2005 | Marinescu | |
| 2008/0209556 | A1 | 8/2008 | Fu | |
| 2009/0007270 | A1* | 1/2009 | Futoransky | H04L 63/1433 726/25 |
| 2009/0307763 | A1* | 12/2009 | Rawlins | G06F 9/44505 726/5 |
| 2010/0169948 | A1 | 7/2010 | Budko | |
| 2010/0175108 | A1 | 7/2010 | Protas | |
| 2011/0185231 | A1 | 7/2011 | Balestrieri | |
| 2012/0260344 | A1 | 10/2012 | Maor | |
| 2012/0324183 | A1 | 12/2012 | Chiruvolu et al. | |
| 2014/0280873 | A1 | 9/2014 | Stickle | |
| 2015/0007325 | A1 | 1/2015 | Eliseev | |
| 2015/0047045 | A1 | 2/2015 | Salsamendi | |
| 2015/0309831 | A1* | 10/2015 | Powers | G06F 16/24565 718/1 |
| 2015/0319186 | A1 | 11/2015 | Lietz | |

(Continued)

*Primary Examiner* — Chau Le
*Assistant Examiner* — Han Yang
(74) *Attorney, Agent, or Firm* — Chamberlain, Hrdlicka, White, Williams, & Aughtry

(57) ABSTRACT

A method and system for implementing threat intelligence as a service in a cloud computing environment. Specifically, the disclosed method and system entail leveraging existing disaster recovery (DR) solutions to perform threat intelligence tests and identify known cyber security threats and/or anomalous activity instigated by unknown cyber security threats, if any, on system images backed up on the existing DR solution. In leveraging existing DR solutions, a threat intelligence service is integrated into the existing DR solution as an additional feature.

19 Claims, 7 Drawing Sheets

(56) References Cited

U.S. PATENT DOCUMENTS

| | | |
|---|---|---|
| 2016/0314302 A1 | 10/2016 | Sabetta |
| 2016/0366185 A1 | 12/2016 | Lee |
| 2017/0068815 A1 | 3/2017 | Lu |
| 2017/0098071 A1 | 4/2017 | Stopel |
| 2017/0126709 A1* | 5/2017 | Baradaran ........... H04L 63/1416 |
| 2017/0302689 A1* | 10/2017 | Jiang ....................... H04L 29/06 |
| 2018/0063181 A1* | 3/2018 | Jones .................. H04L 63/1433 |
| 2018/0212987 A1* | 7/2018 | Tamir .................. H04L 63/1408 |

\* cited by examiner

METHOD AND SYSTEM FOR IMPLEMENTING THREAT INTELLIGENCE AS A SERVICE

BACKGROUND

The execution of threat intelligence tests on an actual computing system can be a disruptive process, which often consumes much of the computing resources on the actual computing system, thereby impacting the performance of the actual computing system and inconveniencing the users.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method and system for implementing threat intelligence as a service in a cloud computing environment. Specifically, one or more embodiments of the invention entail leveraging existing disaster recovery (DR) solutions to perform threat intelligence tests and identify known cyber security threats and/or anomalous activity instigated by unknown cyber security threats, if any, on system images backed up on the existing DR solution. In leveraging existing DR solutions, a threat intelligence service is integrated into the existing DR solution as an additional feature.

Figure 1:
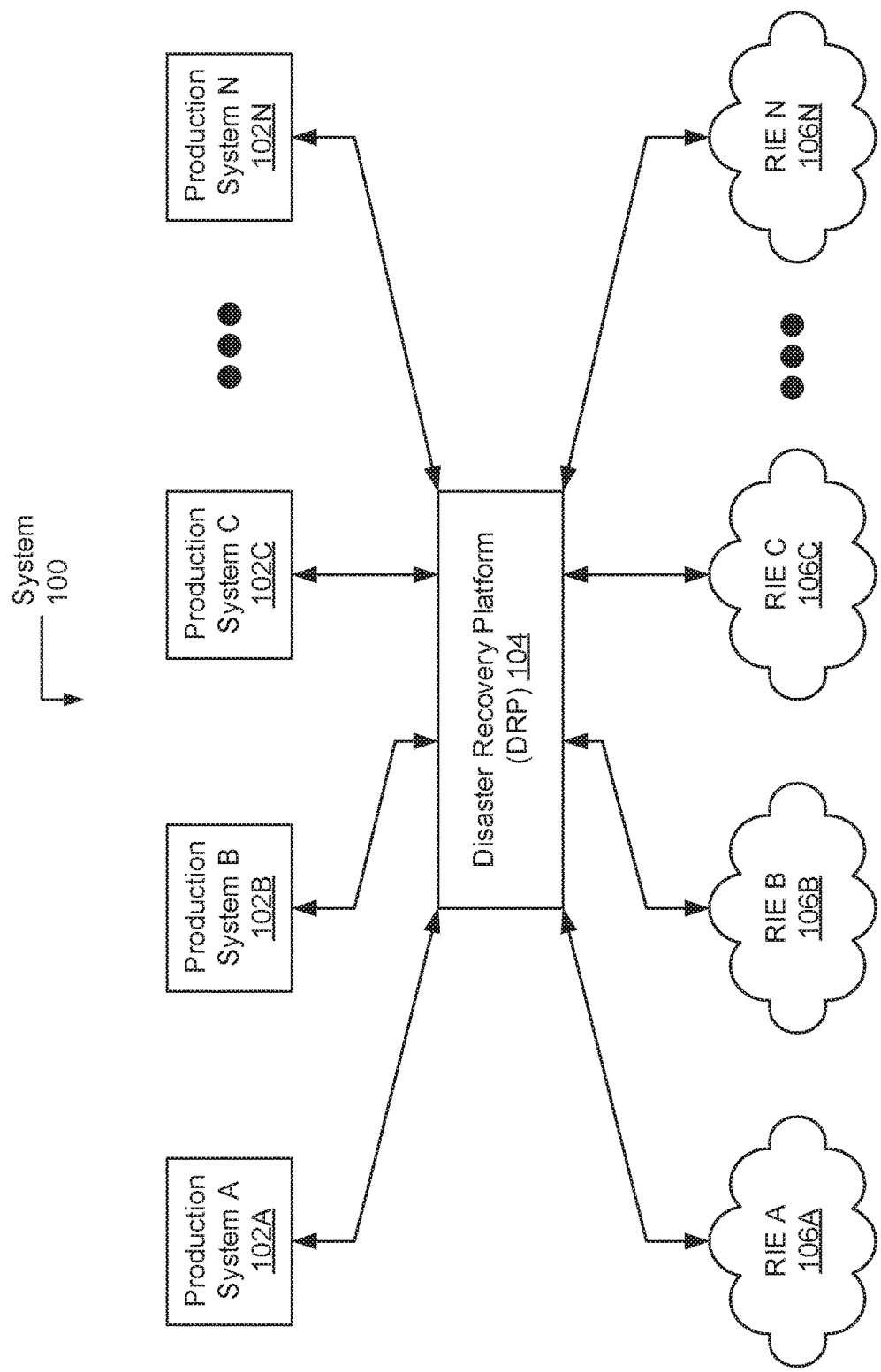
FIG. 1 shows a system in accordance with one or more embodiments of the invention.

FIG. 1 shows a system in accordance with one or more embodiments of the invention. The system (100) includes one or more production systems (102A-102N) operatively connected to a disaster recovery platform (DRP) (104), which in turn is operatively connected to one or more restored image environments (RIEs) (106A-106N). Each of these components is described below.

In one embodiment of the invention, the aforementioned components may be directly or indirectly connected to one another through a network (e.g., a local area network (LAN), a wide area network (WAN) such as the Internet, a mobile network, or any other network). The network (not shown) may be implemented using any combination of wired and/or wireless connections. In embodiments in which the aforementioned components are indirectly connected, there may be other networking components or systems (e.g., switches, routers, gateways, etc.) that facilitate communication and/or information exchange. Further, the aforementioned components may communicate with one another using any combination of wired and/or wireless communication protocols.

In one embodiment of the invention, a production system (102A-102N) may be any computing system (see e.g., FIG. 7) used for various applications. These applications may, for example, require large-scale and complex data processing. In one embodiment of the invention, a production system (102A-102N) may be any computing system that may serve multiple users concurrently. Further, a production system (102A-102N) may be programmed to provide and manage the allocation of computing resources towards the implementation of various processes (e.g., tasks) that may be instantiated by one or more users. Examples of a production system (102A-102N) include, but are not limited to, a cluster of interconnected desktop computers, laptop computers, smartphones, tablet computers, gaming consoles, servers, mainframes, or any combination thereof.

In one embodiment of the invention, the DRP (104) may be a hardware and/or software implemented service that provides failover and threat intelligence to a cloud computing environment. The DRP (104) may be implemented on one or more servers (not shown). Each server may be a physical server or a virtual server that may be cloud-based. In one embodiment of the invention, the DRP (104) may be implemented on one or more computing systems similar to the exemplary computing system shown in FIG. 7. Further, the DRP (104) may be any set of computer systems that may be programmed to receive requests, process requests, and based on the processing of requests, extend services and/or resources to one or more production systems (102A-102N). The DRP (104) is described in further detail below with respect to FIG. 2.

Figure 3:
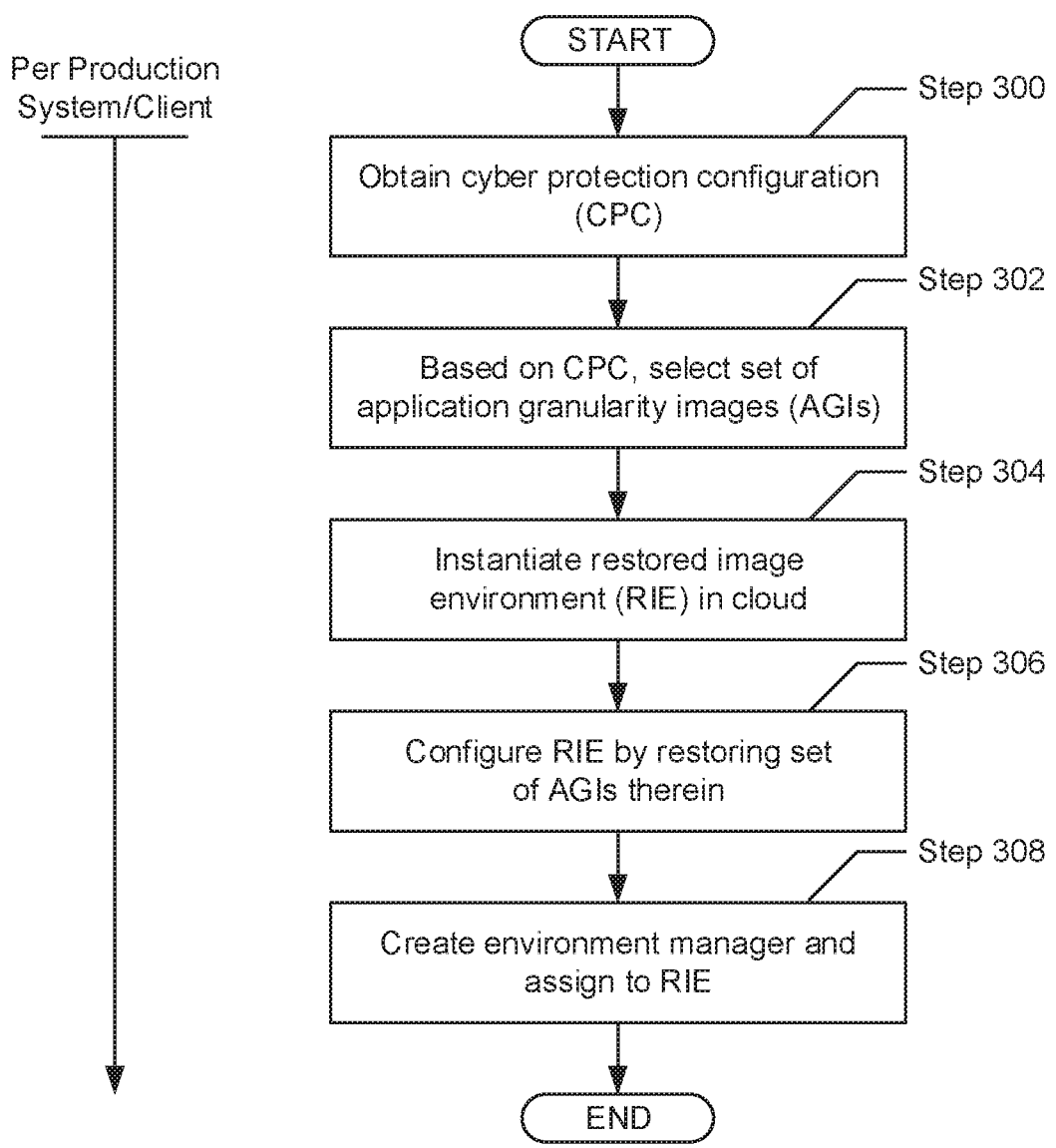
FIG. 3 shows a flowchart describing a method for configuring a restored image environment in accordance with one or more embodiments of the invention.
Figure 4:
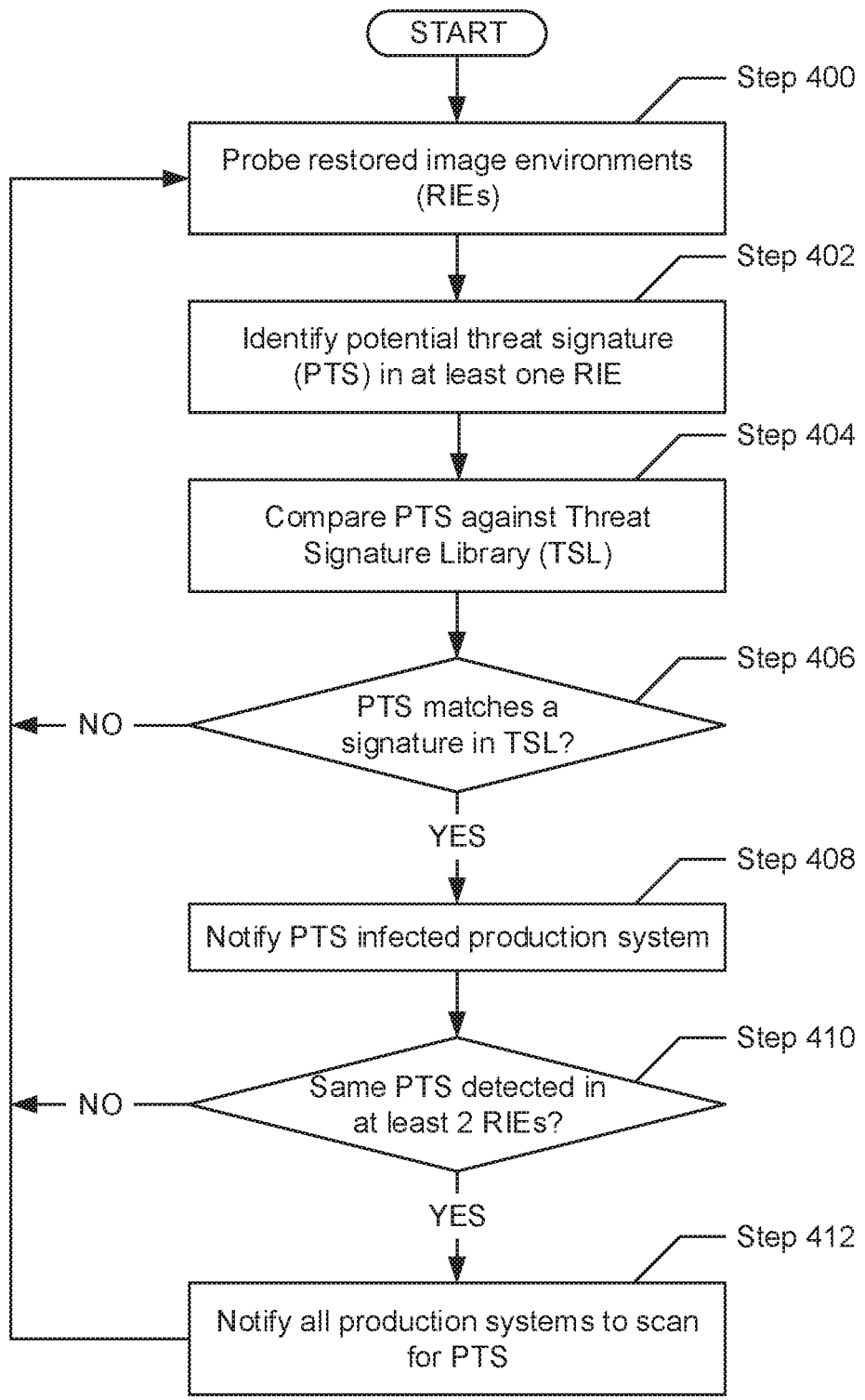
FIG. 4 shows a flowchart describing a method for implementing threat intelligence as a service in accordance with one or more embodiments of the invention.
Figure 5:
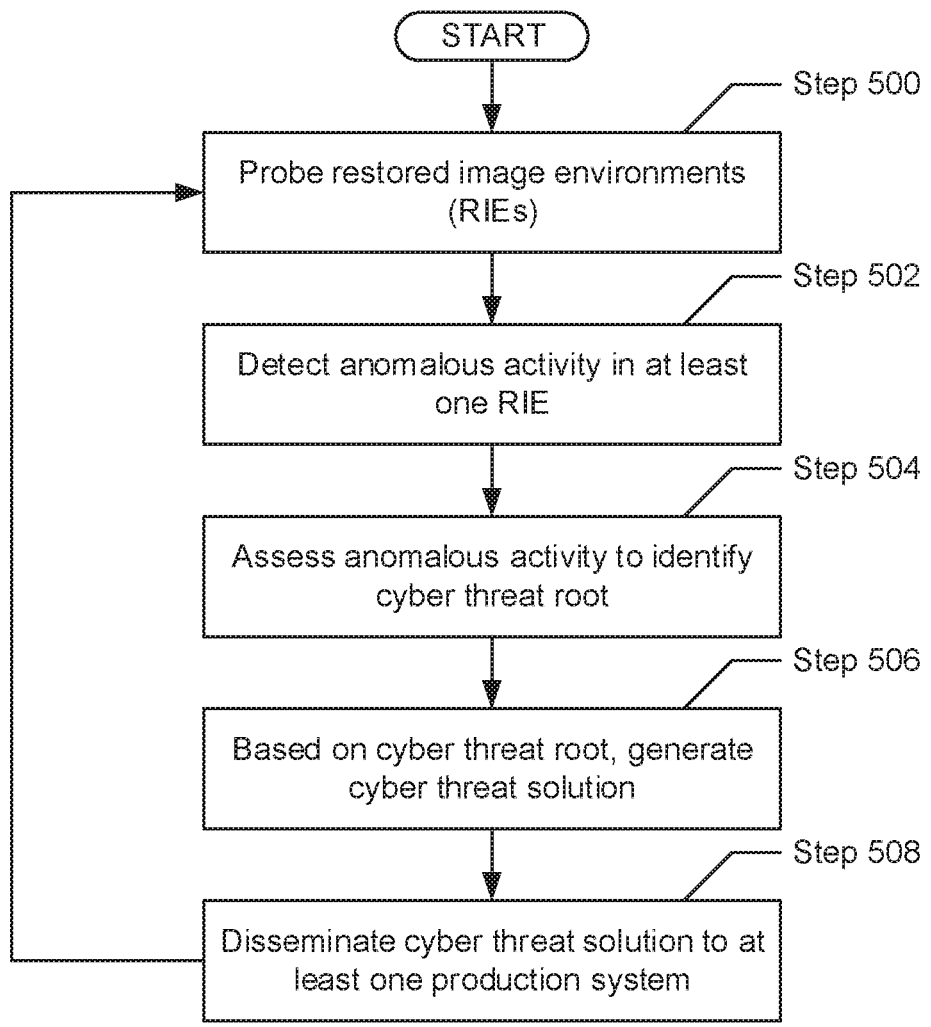
FIG. 5 shows a flowchart describing a method for implementing threat intelligence as a service in accordance with one or more embodiments of the invention.

In one embodiment of the invention, a RIE (106A-106N) may be an isolated (i.e., closed and protected) cloud computing environment for executing threat intelligence assessments (see e.g., FIGS. 3-5). A RIE (106A-106N) may be implemented on one or more servers (not shown). Each server may be a physical server or a virtual server that may be cloud-based. In one embodiment of the invention, a RIE (106A-106N) may be implemented on one or more computing systems similar to the exemplary computing system in FIG. 7. Furthermore, in one embodiment of the invention, a RIE (106A-106N) may be hosted on a subset of the servers and/or computing systems that form the DRP (104). In another embodiment of the invention, a RIE (106A-106N) may be hosted on a set of servers and/or computing systems do not form the DRP (104). Moreover, isolation of a RIE (106A-106N) may be guaranteed through the implementation of a network configuration on a cloud computing networking. The network configuration may, for example, limit access to the RIEs (106A-106N) from external sources and other RIEs (106A-106N) (with the exception of the availability of one computer port per RIE (106A-106N) through which an environment manager (described below) may monitor the RIE (106A-106N). The network configuration may further, for example, obstruct access to external elements by the computing resources (e.g., virtual machines, containers, etc.) executing within the one or more RIEs (106A-106N).

While FIG. 1 shows a configuration of components, other system configurations may be used without departing from the scope of the invention.

Figure 2:
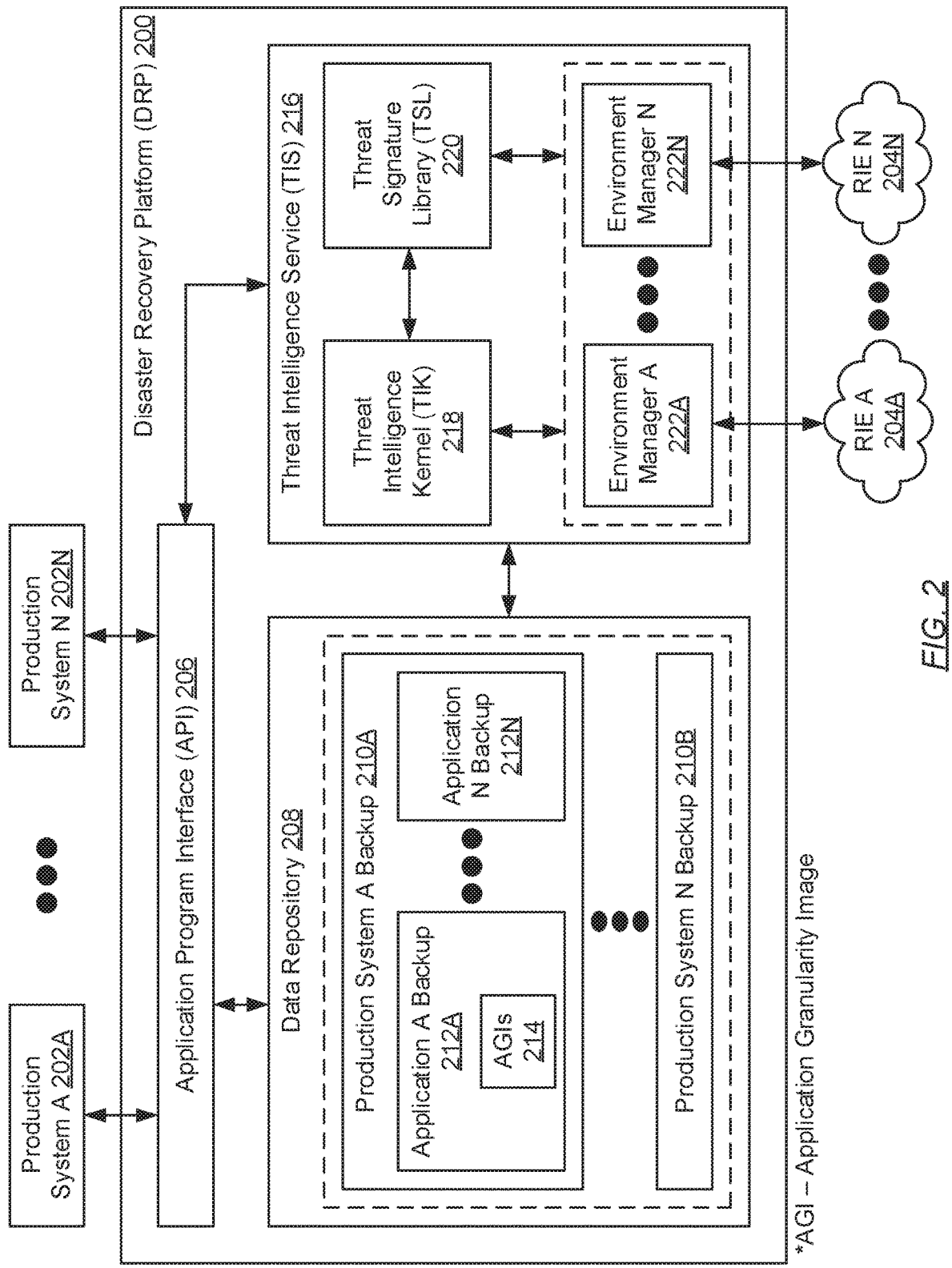
FIG. 2 shows a disaster recovery platform in accordance with one or more embodiments of the invention.

FIG. 2 shows a disaster recovery platform (DRP) in accordance with one or more embodiments of the invention. The DRP (200) includes an application program interface (API) (206), a data repository (208), and a threat intelligence service (TIS) (216). Each of these components is described below.

In one embodiment of the invention, the API (206) may be a hardware and/or software implemented construct that may provide a specification for the exchange of information between the DRP (200) and one or more production systems (202A-202N). For example, the API (206) may establish that the exchange of information entails a request for processing and a return of a response, if any, based on the outcome of the processing, where the request and response conform to an accepted communication protocol (e.g., hyper text transfer protocol secure (HTTPS)). In one embodiment of the invention, the API (206) may include logic necessary to access the data repository (208) and interact with the TIS (216). By way of an example, the API (206) may be a web API accessed through a webpage and/or web browser, and a WAN (e.g., Internet) connection.

In one embodiment of the invention, the API (206) may include functionality to: (i) receive application granularity images (AGIs) (214) (e.g., for one or more applications executing on a production system (202A-202N)) from one or more production systems (202A-202N) for backup and archiving; (ii) access the data repository (208) to store any received AGIs (214); (iii) receive threat intelligence reports from the TIS (216); (vi) encode threat intelligence reports in a format, and based on a communication protocol, agreed upon by the API (206) and one or more production systems (202A-202N); and (v) transmit the encoded threat intelligence reports to one or more production systems (202A-202N). One of ordinary skill will appreciate that the API (206) may perform other functionalities without departing from the scope of the invention.

In one embodiment of the invention, the data repository (208) may be a storage system or medium for consolidating various forms of data. The data repository (208) may be implemented using any type of storage unit and/or device (e.g., a file system, a database, a collection of tables, or any other storage mechanism). Further, the data repository (208) may be implemented using multiple storage units and/or devices, which may or may not be of the same type or located at the same physical site. In one embodiment of the invention, the data repository (208) may be implemented using persistent (i.e., non-volatile) storage media such as, for example, optical storage, magnetic storage, NAND Flash Memory, NOR Flash Memory, Magnetic Random Access Memory (M-RAM), Spin Torque Magnetic RAM (ST-RAM), Phase Change Memory (PCM), or any other memory defined as a non-volatile Storage Class Memory (SCM).

In one embodiment of the invention, the data repository (208) may be configured to store at least one or more sets of AGIs (214). An AGI (214) may be an image-based snapshot of any granularity of an application executing on a production system (202A-202N) at a given time. Specifically, an AGI (214) may be an image-based snapshot of a portion of a full application, or alternatively, an image-based snapshot of a full application in entirety. More specifically, in one embodiment of the invention, an AGI (214) may be an exact copy of a computer process (i.e., an instance of a computer program) executing under a full application (i.e., a computer program) running/residing on a production system (202A-202N) at a given time. In such an embodiment, the computer process may implement a subset of the functionalities, features, and/or responsibilities of the full application under which the computer process is executing.

In another embodiment of the invention, an AGI (214) may be an exact copy of a full application (e.g., an operating system (OS), an email application, a word processing application, etc.), which may be represented through a set of computer processes that collectively implement all the functionalities, features, and/or responsibilities of the full application. In either of the above-mentioned embodiments, an AGI (214) may additionally include state information detailing the state of the associated application granularity at the given time, as well as application configurations and data relevant to the associated application granularity at the given time. Furthermore, an AGI (214) may be generated at a production system (202A-202N), or alternatively, by a data backup process (not shown) executing on the DRP (200). In one embodiment of the invention, an AGI (214) may be generated at periodic time intervals based on a backup schedule configured by administrators of a production system (202A-202N).

Moreover, in one embodiment of the invention, a set of AGIs (214) associated with an application may be stored in a distinct application backup (212A-212N), which in turn may be stored in a distinct production system backup (210A-210N) within the data repository (208). A production system backup (210A-210N) may be a physical or logical partition of the data repository (208) reserved for the storage of application backups (212A-212N) and other information pertinent to one of the one or more production systems (202A-202N). An application backup (212A-212N), on the other hand, may be a physical or logical partition of a production system backup (210A-210N) reserved for the storage of one or more AGIs (214) and other information pertinent to one of the one or more applications executing/residing on one of the one production systems (202A-202N).

For clarification of these terms, by way of an example, consider that the DRP (200) supports three production systems (202A-202N) on which two applications are executing on a first production system, four applications are executing on a second production system, and ten applications are executing on a third production system, respectively. Subsequently, based on this configuration, the data repository (208) may be partitioned into three production system backups (210A-210N), where: (i) the first production system backup may be partitioned into two application backups (212A-212N), whereby each application backup (212A-212N) stores a set of one or more AGIs (214) associated with one of the two applications executing on the first production system; (ii) the second production system backup may be partitioned into four application backups (212A-212N), whereby each application backup (212A-212N) stores a set of one or more AGIs (214) associated with one of the four applications executing on the second production system; and (iii) the third production system backup may be partitioned into ten application backups (212A-212N), whereby each application backup (212A-212N) stores a set of one or more AGIs (214) associated with one of the ten applications executing on the third production system.

In one embodiment of the invention, the data repository (208) may further store a cyber protection configuration (CPC) (not shown). A CPC may be a script, expressed in computer readable program code that outlines a cyber security and/or threat intelligence protection plan for a production system (202A-202N). Specifically, the CPC may specify the parameters by which the TIS (216) may execute one or more threat intelligence tests (described below) on one or more sets of AGIs (214). More specifically, the CPC may specify, but is not limited to specifying: (i) which AGIs (214) (i.e., retrieved from which one or more application backups (212A-212N)) representing which one or more applications executing on the production system (202A-202N) (i.e., retrieved from production system backup (210A-210N) for the production system (202A-202N)) are to be subjected to assessments; (ii) the periodicity of the assessments; (iii) a workflow that may describe the order and logic of the restoring of one or more AGIs (214) in a RIE (204A-204N); (iv) one or more parameters that may be outputted in the event of a successful assessment; (v) one or more parameters that may be outputted in the event of an unsuccessful assessment; and (vi) one or more parameters that may be used as input for each one or more restored AGIs (214).

In one embodiment of the invention, the TIS (216) may be a sub-service or a feature hosted by the DRP (200). Specifically, the TIS (216) may be an analytics driven computer service offered to one or more production systems (202A-202N) over the Internet (e.g., via a cloud service). The TIS (216) may be implemented using hardware, software, firmware, or any combination thereof. Furthermore, the TIS (216) includes a threat intelligence kernel (TIK) (218), a threat signature library (TSL) (220), and one or more environment managers (222A-222N). Each of these components is described below.

In one embodiment of the invention, the TIK (218) may be an application or computer program for the TIS (216) executing on the underlying hardware of the DRP (200). The TIK (216) may include functionality to: (i) access the data repository (208) to retrieve one or more sets of AGIs (214) and CPCs (not shown); (ii) based on a CPC for each production system (202A-202N), restore a set of AGIs (214) in a RIE (204A-204N); (iii) create and assign a environment manager (222A-222N) to a RIE (204A-204N); (iv) access the TSL (220) to update the known threat signatures (described below) stored therein; (v) receive potential threat signature (PTS) notifications and one or more cyber threat solutions from one or more environment managers (222A-222N); and (vi) issue threat intelligence reports, based on PTS notifications and/or cyber threat solutions, to the API (206). One of ordinary skill will appreciate that the TIK (218) may perform other functionalities without departing from the scope of the invention.

In one embodiment of the invention, the TSL (220) may be a repository for storing known cyber threat or attack signatures. A cyber threat signature (not shown) may be a piece of information (e.g., a recurring bit string, a data pattern, etc.) that uniquely identifies a particular cyber security threat or attack aimed at exploiting one or more weaknesses or vulnerabilities on a computing system (e.g., a production system (202A-202N)). The TSL (220) may be implemented using any type of storage unit and/or device (e.g., a file system, a database, a collection of tables, or any other storage mechanism). Further, the TSL (220) may be implemented using multiple storage units and/or devices, which may or may not be of the same type or located at the same physical site. In one embodiment of the invention, the TSL (220) may be implemented using persistent (i.e., non-volatile) storage media such as, for example, optical storage, magnetic storage, NAND Flash Memory, NOR Flash Memory, Magnetic Random Access Memory (M-RAM), Spin Torque RAM (ST-RAM), Phase Change Memory (PCM), or any other memory defined as a non-volatile Storage Class Memory (SCM).

Examples of cyber threats or attacks that cyber threat signatures stored in the TSL (220) may identify include, but are not limited to, malware, phishing attacks, password attacks, denial-of-service (DOS) attacks, man-in-the-middle (MITM) attacks, structured query language (SQL) injection attacks, cross-site scripting (XSS) attacks, session hijacking attacks, spear-phishing attacks, network probing attacks, brute-force cracking attacks, drive-by download attacks, advanced persistent threat (APT) attacks, and ransomware.

In one embodiment of the invention, an environment manager (222A-222N) may be a computer process (or an instance of a computer program) executing on the underlying hardware of the DRP (200). Specifically, an environment manager (222A-222N) may be a computer process dedicated towards the management of one RIE (204A-204N). Subsequently, in one embodiment of the invention, an environment manager (222A-222N) may include functionality to: (i) probe a respective RIE (204A-204N) by employing one or more scanning methodologies (e.g., port scanning, network vulnerability scanning, web application security scanning, database security scanning, host based vulnerability scanning, etc.) to identify potential threat signatures (PTSs); (ii) access the TSL (220) to perform pattern comparisons between PTSs and known cyber threat or attack signatures stored in the TSL (220); (iii) based on the pattern comparisons, determine whether a PTS matches a known cyber threat signature associated with a known cyber security threat or attack; (iv) based on the determining, issuing PTS notifications to the TIK (218); (v) probe a respective RIE (204A-204N) by continuously monitoring the behavior of a restored set of AGIs therein to identify anomalous events or trends; (vi) assess any identified anomalous activity to identify the cause or cyber threat root; (vii) generate cyber threat solutions (e.g., fixes, patches, recommendations, etc.) based on identified cyber threat roots to combat identified anomalous activity; and (vi) provide cyber threat solutions to the TIK (218) for subsequent dissemination to one or more production systems (202A-202N) through the API (206).

FIG. 3 shows a flowchart describing a method for configuring a restored image environment (RIE) in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel. In one embodiment of the invention, the steps shown in FIG. 3 may be performed in parallel with any other steps shown in FIGS. 4 and 5 without departing from the scope of the invention.

Turning to FIG. 3, the following iteration of steps (i.e., Steps 300 through 308) may be performed for each production system the DRP supports. In one embodiment of the invention, the attending of each production system, and thus, the performing of each iteration of steps, may occur sequentially. In another embodiment of the invention, the attending of each production system, and thus, the performing of each iteration of steps, may occur concurrently.

In Step 300, the TIK (see e.g., FIG. 2) obtains a CPC from the data repository residing on the DRP. In one embodiment of the invention, the CPC may be obtained in response to an enrollment/activation of the TIS (i.e., a sub-service or feature of the DRP) by administrators of the production system. Further, the CPC may have been defined by the administrators of the production system during their enrollment/activation of the sub-service. As described above, in one embodiment of the invention, the CPC may specify, but is not limited to specifying: (i) which AGIs (i.e., retrieved from which one or more application backups) representing which one or more applications executing on the production system (i.e., retrieved from production system backup for the production system) are to be subjected to assessments; (ii) the periodicity of the assessments; (iii) a workflow that may describe the order and logic of the restoring of one or more AGIs in a RIE; (iv) one or more parameters that may be outputted in the event of a successful assessment; (v) one or more parameters that may be outputted in the event of an unsuccessful assessment; and (vi) one or more parameters that may be used as input for each one or more restored AGIs.

In Step 302, based on the CPC (obtained in Step 300), the TIK selects a set of one or more AGIs stored in the data repository. Specifically, in one embodiment of the invention, the TIK may select/retrieve the set of one or more AGIs from one or more application backups (i.e., partitions) in the production system backup in the data repository reserved for the storage of information pertinent to the production system. Further, in one embodiment of the invention, the set of AGIs may include one AGI, where the one AGI identifies a computer process (i.e., an instance of a computer program implementing one or more functionalities, features, and/or responsibilities) associated with an application executing on the production system. In another embodiment of the invention, the set of AGIs may include one AGI, where the one AGI identifies a full application (i.e., a computer program), which may be implemented by multiple computer processes. Alternatively, the full application may be identified through multiple AGIs specified in the set of AGIs, where each AGI of the set of AGIs implements a portion (i.e., a subset of the functionalities, features, and/or responsibilities) of the full application. In yet another embodiment of the invention, the set of AGIs may include multiple AGIs, where each mutually exclusive subset of the multiple AGIs identifies at least a portion of a different application executing on the production system. Thus, in such an embodiment, the multiple AGIs may collectively implement multiple applications (which may or may not include an OS), which may identify a portion of a computing system (i.e., a production system), if not a full computing system in its entirety. Furthermore, in one embodiment of the invention, each AGI in the set of AGIs may correspond to a snapshot of an application granularity executing on the production system within a margin of time from an exact given time.

In Step 304, the TIK instantiates a RIE. As described above, in one embodiment of the invention, a RIE may be an isolated (i.e., closed and protected) cloud computing environment for executing threat intelligence assessments. Instantiating the RIE may entail allotting and/or dedicating physical and/or virtual (i.e., cloud-based) servers or computing systems, and associated computing resources, towards the fulfillment of one or more threat intelligence assessments. In one embodiment of the invention, the servers or computing systems that may be allotted and/or dedicated may include a subset of the servers and/or computing systems forming the DRP. In another embodiment of the invention, the servers or computing systems that may allotted and/or dedicated may exclude the set of servers and/or computing systems forming the DRP, although still operatively connected to the DRP.

In Step 306, the TIK then configures the RIE (instantiated in Step 304) to restore the set of AGIs (selected in Step 302). Specifically, in one embodiment of the invention, the TIK may allocate RIE computing resources to instantiate one or more virtual machines (VMs) and/or containers to emulate the set of AGIs. More specifically, the one or more VMs and/or containers may be programmed to emulate each component, whether the component is hardware, software, or firmware, and their functionalities and interactions, thereby replicating the set of AGIs.

In one embodiment of the invention, a VM may be a distinct operating environment configured to inherit underlying functionality of the host OS (and access to the underlying host hardware) via an abstraction layer. Further, a VM may include a separate instance of an OS, which may be distinct from the host OS. By way of one example, one or more embodiments of the invention may be implemented based on VMware® architecture, which may involve: (i) one or more VMs executing on a host computer system (i.e., the DRP) such that each VM serves as a host to an instance of a guest OS; and (ii) a hypervisor layer serving to facilitate intra-host communication between the one or more VMs and the host computer system hardware. By way of another example, one or more embodiments of the invention may be implemented based on Xen® architectures, which may involve: (i) a control host OS (e.g., Dom 0) including a hypervisor; and (ii) one or more VMs (e.g., Dom U) executing guest OS instances. VMware® is a registered trademark of VMware, Inc. Xen® is a trademark overseen by the Xen Project Advisory Board.

In one embodiment of the invention, a container may be an isolated, lightweight virtualization mechanism (or software construct) that allows for the running of a computer process, an application, or an OS within the container without the overhead of executing a hypervisor (as is needed for executing VMs on underlying hardware). Minimal overhead may be generated by containers because: (i) containers share the same OS kernel with other containers and the underlying host (e.g., a server, a computing system (see e.g., FIG. 7), etc.); and (ii) containers (unlike virtual machines)

do not need to emulate physical hardware. Further, containers may be implemented virtually by a host OS.

In Step 308, after restoring the set of AGIs within the RIE (in Step 306), the TIK creates an environment manager. In one embodiment of the invention, creation of the environment manager may entail instantiating a computer process and affording the computer process with functionalities (described above) befitting those necessary for RIE management and threat intelligence assessment. Thereafter, the TIK assigns (or associates) the environment manager to (or with) the RIE (instantiated and configured in Steps 304 and 306).

FIG. 4 shows a flowchart describing a method for implementing threat intelligence as a service in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel. In one embodiment of the invention, the steps shown in FIG. 4 may be performed in parallel with any other steps shown in FIGS. 3 and 5 without departing from the scope of the invention.

Turning to FIG. 4, in Step 400, each environment manager (see e.g., FIG. 2) probes their respective/assigned RIE. In one embodiment of the invention, an environment manager may probe their assigned RIE by employing one or more data scanning techniques, which may include, but are not limited to, techniques directed to port scanning, network vulnerability scanning, web application security scanning, database security scanning, and host based vulnerability scanning. The employed scanning techniques may be used to search for potential threat signatures (PTSs) (e.g., unique recurring bit strings, data patterns, etc.) potentially representative of one or more known cyber security threats or attacks.

In Step 402, at least one environment manager identifies a PTS exhibited within the set of AGIs restored in their assigned RIE. In one embodiment of the invention, the identifying of the PTS may result from the probing of an assigned RIE (performed in Step 400). In Step 404, each of the aforementioned environment managers subsequently accesses the TSL to compare their identified PTS against the one or more known cyber threat/attack signatures stored in the TSL that are associated with one or more known cyber security threats or attacks.

In Step 406, each of the aforementioned environment managers then determines whether their identified PTS relates to a known cyber security threat or attack. If it is determined, based on the comparison performed (in Step 404), that an identified PTS matches one of the one or more known cyber threat/attack signatures stored in the TSL, then the identified PTS is affirmed as being associated with a known cyber security threat/attack, and the process proceeds to Step 408. On the other hand, if it is alternatively determined, based on the comparison performed (in Step 404), that an identified PTS matches none of the one or more known cyber threat/attack signatures stored in the TSL, then the identified PTS is affirmed as not being associated with a known cyber security threat/attack, and the process proceeds back to Step 400, where further probing of a RIE is performed.

In Step 408, after determining (in Step 406) that an identified PTS matches one of the one or more known cyber threat/attack signatures stored in the TSL, the respective environment manager(s) issue (i.e., generates and provides) a PTS notification to the TIK. In one embodiment of the invention, a PTS notification may include, but is not limited to including: (i) an environment manager ID uniquely identifying the environment manager issuing the PTS notification; (ii) a production system ID uniquely identifying the production system associated with the set of AGIs assessed by the environment manager; (iii) one or more parameters specified in the CPC (described above) associated with the production system; (iv) the PTS identified by the environment manager; and (v) brief information describing the known cyber security threat or attack to which the identified PTS matches. Upon receiving one or more PTS notifications from one or more environment managers, the TIK may generate one or more threat intelligence reports using at least the one or more PTS notifications. Specifically, each threat intelligence report includes information outlined in one PTS notification of the one or more received PTS notifications. Further, after their generation, the TIK provides the one or more threat intelligence reports to the API executing on the DRP, where subsequently, the API encodes the one or more threat intelligence reports and transmits each threat intelligence report to a respective production system. Each respective production system that may be a recipient of a threat intelligence report may be the host associated with a set of AGIs found to include a PTS matching a known cyber security threat/attack. From here, each threat intelligence report recipient (i.e., a respective production system) may use the information disclosed in the threat intelligence report to scan for the identified PTS, and deploy measures to counter the effects of the associated known cyber security attack or threat.

In Step 410, the TIK then determines whether two or more PTS notifications (of the one or more PTS notifications received from one or more environment managers in Step 408) disclosed at least one common PTS or common cyber security threat/attack. In one embodiment of the invention, the determination may entail comparing and matching at least a portion of the information (e.g., the PTS identified by the environment manager) disclosed in each received PTS notification with other similar portions disclosed in at least one other received PTS notification. Based on the aforementioned comparing, if it is determined that at least one common PTS or cyber security threat/attack is disclosed in at least two received PTS notifications, then a multi-system pandemic may be occurring, and the process proceeds to Step 412. On the other hand, based on the aforementioned comparing, if it is alternatively determined that each of the received PTS notifications discloses a different PTS or cyber security threat/attack, then notifications to each respective production system (performed in Step 408) is sufficient, and the process proceeds back to Step 400, where probing of the one or more RIEs continues.

In Step 412, after determining (in Step 410) that a multi-system pandemic may be spreading, the TIK generates one or more threat intelligence reports. Each of the one or more threat intelligence reports may be generated using at least a portion of information (e.g., the PTS identified and the brief description of the known cyber security threat/attack for which the identified PTS matches) disclosed in the at least two received PTS notifications that revealed at least one common PTS or cyber security threat/attack. Further, each of the one or more threat intelligence reports may be addressed to one of the one or more production systems the DRP supports. In other words, in one embodiment of the invention, all production systems supported by the DRP may be a threat intelligence report recipient. Following their generation, the TIK subsequently provides the one or more threat intelligence reports to the API executing on the DRP.

Thereafter, the API encodes each of the one or more threat intelligence reports and transmits them towards each production system supported by the DRP. From here, each respective production system may use the information disclosed in their received threat intelligence report to scan for the commonly identified PTS, and deploy measures to counter the effects of the associated multi-system pandemic (i.e., known cyber security attack or threat that has been identified in two or more sets of AGIs associated with two or more production systems).

FIG. 5 shows a flowchart describing a method for implementing threat intelligence as a service in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel. In one embodiment of the invention, the steps shown in FIG. 5 may be performed in parallel with any other steps shown in FIGS. 3 and 4 without departing from the scope of the invention.

Turning to FIG. 5, in Step 500, each environment manager (see e.g., FIG. 2) probes their respective/assigned RIE. In one embodiment of the invention, an environment manager may probe their assigned RIE by employing artificial intelligence to track critical computing system and/or network characteristics exhibited by the set of AGIs restored in their assigned RIE. These critical characteristics may be tracked in order to detect anomalous events or trends that may be induced by the presence of an unknown cyber security threat or attack. Examples of these critical characteristics include, but are not limited to, network traffic volume, network bandwidth use, network protocol use, hard disk activity, CPU load, memory usage, changes in OS registries, system call use, etc.

In Step 502, at least one environment manager detects an anomalous event or trend exhibited within the set of AGIs restored in their assigned RIE. In one embodiment of the invention, the detecting of an anomalous event/trend may result from the probing of an assigned RIE (performed in Step 500). Examples of the state of critical characteristics that may lead to the detection of an anomalous event/trend may include, but are not limited to, a network traffic volume exceeding a predefined threshold volume level, a network bandwidth use exceeding a predefined threshold bandwidth level, an execution of heavy computing resources usage (e.g., high hard drive activity, high CPU load, high memory usage, etc.), a notable change in system behavior, a notable change in the execution of network calls, unauthorized attempts to use encryption, unauthorized attempts to change one or more settings in any OS registries, the unauthorized installation of new services, unauthorized changes to service configurations, the unauthorized installation of new processes, etc.

In Step 504, each of the aforementioned at least one environment manager then assesses the detected anomalous event/trend exhibited within the set of AGIs in their assigned RIE. In one embodiment of the invention, the assessment may be performed in order to identify the cause or cyber threat root instigating the detected anomalous event/trend. In one embodiment of the invention, identification of the cyber threat root(s) may entail correlating the observations perceived by the at least one environment manager which may have led to the detection of the anomalous event/trend exhibited within the set of AGIs in their assigned RIE. In another embodiment of the invention, identification of the cyber threat root(s) may entail activating malware detection tools to assess the detected anomalous event/trend exhibited within the set of AGIs. The malware detection tools may be activated in order to identify whether known malware may embody the cyber threat root(s). In yet another embodiment of the invention, identification of the cyber threat root(s) may entail human intervention by way of the employment of a cyber security/threat expert whom may run forensics on any anomalous event/trend in order to define the cyber threat root(s).

In Step 506, following the identification of the cyber threat root, each of the aforementioned environment managers generates a cyber threat solution. In one embodiment of the invention, the cyber threat solution may be implemented as one or more of the following: (i) a recurring bit string or data pattern (i.e., a cyber threat/attack signature) found to be affiliated with the detected anomalous event/trend, which may be used by a production system to scan for the cyber threat root thereon; (ii) states of one or more critical characteristics that may be an indicator for the presence of the cyber threat root; (iii) a recommendation for mitigating the effects of the cyber threat root, if detected on a production system; and (iv) a patch for repairing and/or resolving the one or more weaknesses in the a production system that the cyber threat root may exploit.

In Step 508, after generating a cyber threat solution, each of the aforementioned environment managers provides the cyber threat solution to the TIK. In one embodiment of the invention, each of the aforementioned at least one environment manager may also provide, along with the cyber threat solution: (i) an environment manager ID uniquely identifying the environment manager providing at least the cyber threat solution; and (ii) a production system ID uniquely identifying the production system associated with the set of AGIs assessed by the environment manager. Upon receiving one or more cyber threat solutions (alongside potentially other information), the TIK generates one or more threat intelligence reports. Each threat intelligence report may be generated using at least a portion of information disclosed in one of the received one or more cyber threat solutions. Further, after their generation, the TIK subsequently provides the one or more threat intelligence reports to the API executing on the DRP. Thereafter, the API encodes each of the one or more threat intelligence reports and transmits them towards one or more production systems. Specifically, in one embodiment of the invention, each respective production system that may be a recipient of a threat intelligence report may be the host associated with a set of AGIs found to be exhibiting anomalous activity. In another embodiment of the invention, all production systems supported by the DRP may be recipients of each threat intelligence report. After dissemination of the one or more threat intelligence reports, the process proceeds back to Step 500, where further probing for anomalous events/trends is performed.

Figure 6:
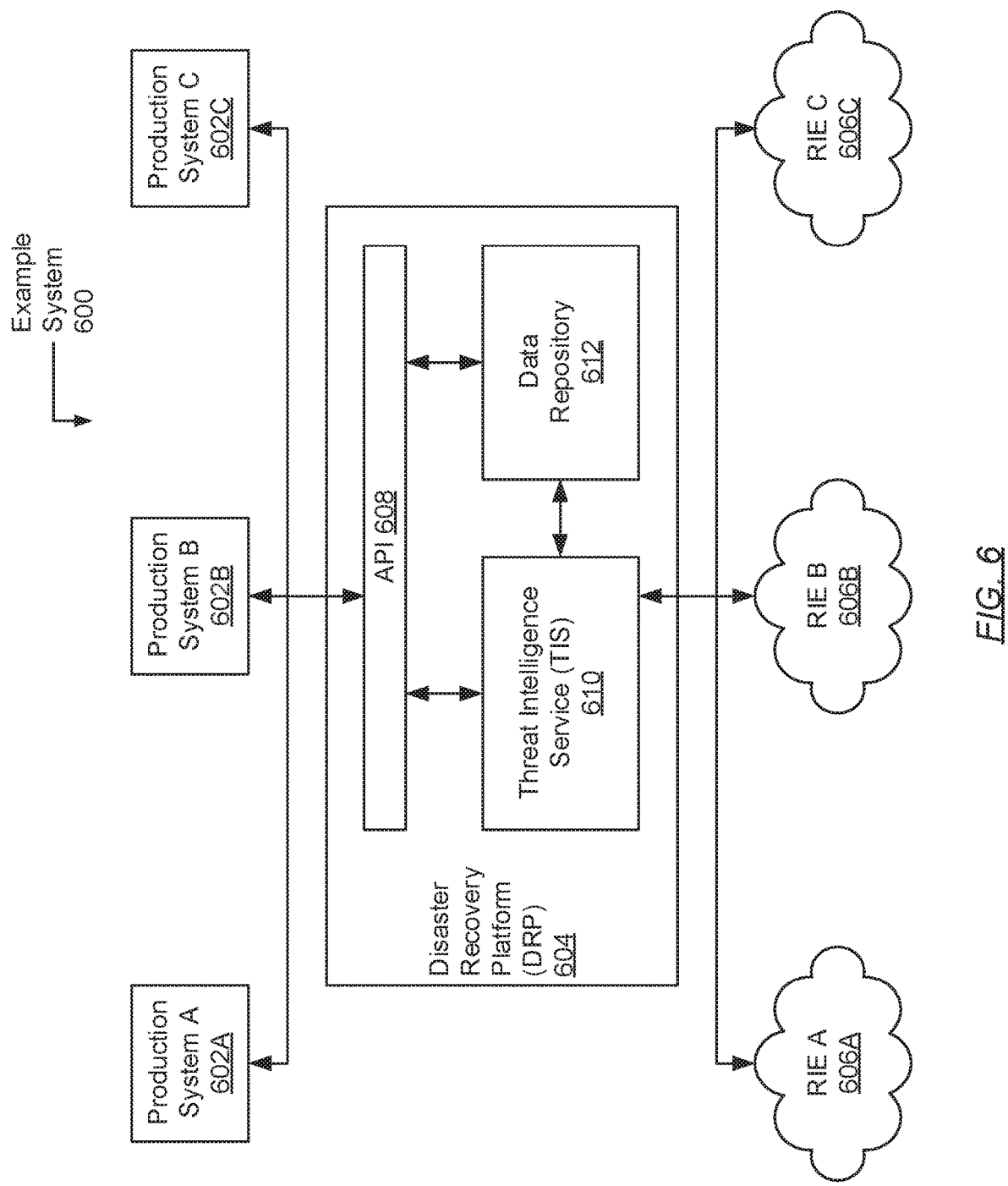
FIG. 6 shows an example system in accordance with one or more embodiments of the invention.

FIG. 6 shows an example system in accordance with one or more embodiments of the invention. The following example, presented in conjunction with components shown in FIG. 6, is for explanatory purposes only and not intended to limit the scope of the invention.

Turning to FIG. 6, the example system (600) includes three production systems (602A-602C) operatively connected to a DRP (604). The DRP (604) includes an application program interface (API) (608) operatively connected to a threat intelligence service (TIS) (610) and a data repository (612). Further included in the example system (600) are three RIEs (606A-606C) operatively connected to the TIS (610).

Turning to the example, consider a scenario whereby administrators of each of the three production systems (602A-602C) have opted to enroll in the threat intelligence as a service feature offered by the DRP (604). That is to say, in addition to using the DRP (604) as a backup and archiving solution, the enrollment grants the testing of sets of AGIs (not shown) in an isolated cloud computing environment to identify known cyber security threats/attacks corresponding to detected PTSs and/or identify unknown cyber security threats/attacks instigating detected anomalous activity, if any. As part of the enrollment process, administrators of each of the three production systems (602A-602C) specify parameters under which the testing will be performed, which may be outlined in a CPC (not shown) tailored to their respective production system (602A-602C).

For example: (i) a first CPC associated with the first production system (602A) may at least specify the selection of a set of email application granularity images (AGIs) (not shown) residing in an email application backup (not shown) of a first production system backup (not shown) belonging to the first production system (602A) within the data repository (612) as a first set of AGIs to be tested; (ii) a second CPC associated with the second production system (602B) may at least specify the selection of a set of system AGIs (not shown) residing in the set of application backups (not shown) of a second production system backup (not shown) belonging to the second production system (602B) within the data repository (612) as a second set of AGIs to be tested; and (iii) a third CPC associated with the third production system (602C) may at least specify the selection of a deduplication service implemented through a set of data compression AGIs and a set of storage system AGIs residing in a data compression application backup and storage system application backup, respectively, of a third production system backup (not shown) belonging to the third production system (602C) within the data repository (612) as a third set of AGIs to be tested.

Upon activation, the TIS (610)—for each of the three production systems—accesses the data repository (612) to obtain and read the parameters specified in the respective CPC (e.g., the first CPC for the first production system (602A), the second CPC for the second production system (602B), and the third CPC for the third production system (602C)). Based on the parameters specified in each CPC, the TIS (610) configures one RIE for each production system in order to perform the threat intelligence tests. More specifically, the threat intelligence kernel (TIK) (not shown) of the TIS (610) identifies the set of email AGIs enclosed as part of the email application backup within the first production system backup belonging to the first production system (602A) in the data repository (612), and restores the set of email AGIs—i.e., the first set of AGIs, including their functionalities and interactions, in the first RIE (606A). Further, the TIK identifies the entire computing system portrayed through the set of system AGIs enclosed as part of the set of application backups within the second production system backup belonging to the second production system (602B) in the data repository (612), and restores the entire computing system—i.e., the set of system AGIs or the second set of AGIs, including all functionalities for and interactions between all applications and the OS, in the second RIE (606B). Further still, the TIK identifies the deduplication service (implemented by a set of data compression AGIs and a set of storage system AGIs) enclosed as part of the data compression application backup and storage system application backup, respectively, within the third production system backup belonging to the third production system (602C) in the data repository (612), and restores the deduplication service—i.e., the set of data compression AGIs and the set of storage system AGIs, or collectively, the third set of AGIs, including all relevant functionalities and interactions, in the third RIE (606C).

After restoring each set of AGIs in the appropriate RIE (606A-606C), the TIK subsequently creates a first environment manager, a second environment manager, and a third environment manager to manage, monitor, and execute at least one threat intelligence test in the first RIE (606A), the second RIE (606B), and the third RIE (606C), respectively. Thereafter, each environment manager (not shown) executes the at least one threat intelligence test by continuously probing their respective RIE (606A-606C). Subsequently, based on the probing, the first environment manager and the third environment manager each identify a potential threat signature (PTS)—e.g., a first PTS exhibited in the first RIE (606A) and a second PTS exhibited in the third RIE (606C). Each environment manager (i.e., the first environment manager and the third environment manager) then proceeds to compare their identified PTS against a set of known cyber threat/attack signatures, associated with a set of known cyber security threats/attacks, stored in a threat signature library (TSL) (not shown). Based on the comparing, each environment manager affiliates their identified PTS to a known cyber security threat/attack—e.g., a first known cyber security threat matching the first PTS and a second known cyber security threat matching the second PTS. Afterwards, the first environment manager and the third environment manager issue a first PTS notification (including at least the first PTS) and a second PTS notification (including at least the second PTS), respectively, to the TIK.

From here, in one scenario, the first known cyber security threat and the second known cyber security threat are different (i.e., the first PTS does not match the second PTS). In this scenario, after receiving the first PTS notification and the second PTS notification, the TIK compares the first PTS and the second PTS enclosed therein, and determines that the first PTS and the second PTS do not match. In one embodiment of the invention, the identification of different known cyber security threats in different RIE (e.g., the first RIE (606A) or the second RIE (606C)) may be indicative that each identified cyber security threat is a local event specifically targeting one system (e.g., the first production system (602A) or the third production system (602C)). Based on this determination, the TIK generates a first threat intelligence report using at least a portion of the first PTS notification, and subsequently, generates a second threat intelligence report using at least a portion of the second PTS notification. Thereafter, the TIK provides the first threat intelligence report (addressed to the first production system (602A)) and the second threat intelligence report (addressed to the third production system (602C)) to the API (608). Upon receiving the first threat intelligence report, the API (608) encodes the first threat intelligence report and transmits it towards the first production system (602A). Further, upon receiving the second threat intelligence report, the API (608) encodes the second threat intelligence report and transmits it towards the third production system (602C).

In another scenario, the first known cyber security threat and the second known cyber security threat are the same (i.e., the first PTS matches the second PTS). In this scenario, after receiving the first PTS notification and the second PTS notification, the TIK compares the first PTS and the second PTS enclosed therein, and determines that the first PTS and the second PTS match. In one embodiment of the invention, the identification of a common known cyber security threat in different RIE (e.g., the first RIE (606A) and the third RIE (606C)) may be indicative that the common known cyber security threat is part of a global pandemic targeting multiple systems (e.g., at least the first production system (602A) and the third production system (602C)). Based on this determination, the TIK generates a third threat intelligence report using at least a portion of the first or second PTS notification. Thereafter, the TIK provides the third threat intelligence report (addressed to all production systems (602A-602C)) to the API (608). Upon receiving the third intelligence report, the API (608) encodes the third threat intelligence report and broadcasts it towards the first production system (602A), the second production system (602B), and the third production system (602C).

Figure 7:
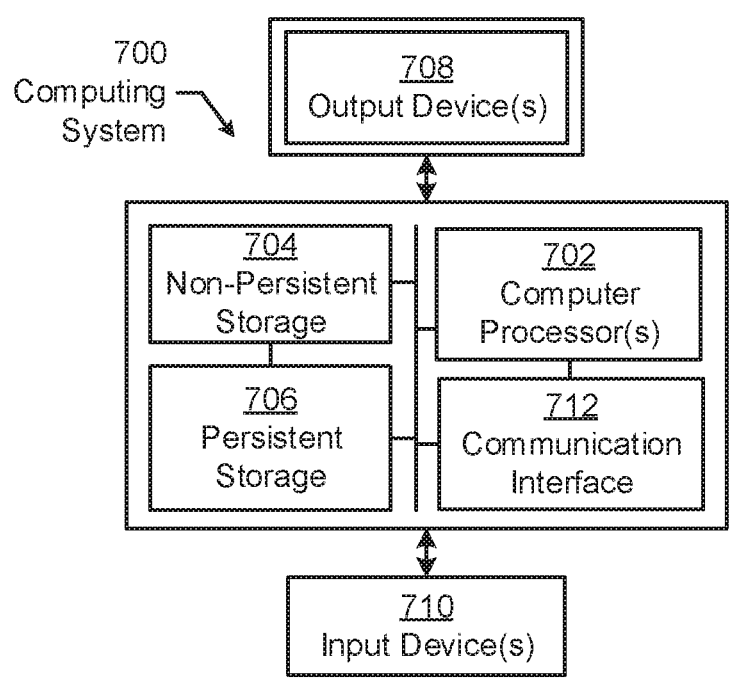
FIG. 7 shows a computing system in accordance with one or more embodiments of the invention.

FIG. 7 shows a computing system in accordance with one or more embodiments of the invention. The computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device. Further, the communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

In one embodiment of the invention, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for implementing threat intelligence as a service, comprising:
for each production system of a set of production systems operatively connected to a disaster recovery platform (DRP):
receiving, by the DRP, a set of application granularity images (AGIs) for at least one application executing on the production system;
storing, for backup and archiving, the set of AGIs in a data repository;
obtaining a cyber protection configuration (CPC) associated with the production system;
selecting, based on the CPC, the set of AGIs from the data repository;
instantiating a restored image environment (RIE) in a cloud computing network;
configuring the RIE by restoring the set of AGIs in the RIE; and
creating an environment manager to probe the RIE in search for one selected from a group consisting of potential threat signatures (PTSs) and anomalous events.

2. The method of claim 1, wherein the CPC comprises a set of parameters outlining at least one threat intelligence test, wherein the set of parameters specify at least the set of AGIs for the at least one application.

3. The method of claim 1, further comprising:
for each RIE of a first set of RIEs:
identifying a PTS exhibited by the set of AGIs restored in the RIE;
matching the PTS to one known cyber threat signature of a set of known cyber threat signatures; and
issuing, in response to the matching, a PTS notification comprising at least the PTS.

4. The method of claim 3, wherein the first set of RIEs is a subset of a second set of RIEs, wherein the second set of RIEs comprises one RIE for each production system of the set of production systems.

5. The method of claim 3, further comprising:
for each PTS notification of a set of PTS notifications issued as a result of monitoring the first set of RIEs:
generating a threat intelligence report comprising at least the PTS disclosed in the PTS notification; and
transmitting the threat intelligence report to a recipient production system,
wherein the recipient production system is one production system in a subset of production systems of the set of production systems,
wherein each production system of the subset of production systems is associated with the set of AGIs restored in one RIE of the first set of RIEs.

6. The method of claim 3, further comprising:
using a set of PTS notifications issued as a result of monitoring the first set of RIEs:
obtaining a first PTS enclosed in a first PTS notification of the set of PTS notifications;
obtaining a second PTS enclosed in a second PTS notification of the set of PTS notifications;
determining that the first PTS matches the second PTS;
generating, based on the determining, a threat intelligence report comprising at least the first PTS; and
transmitting the threat intelligence report to all production systems in the set of production systems.

7. The method of claim 1, further comprising:
for each RIE of a first set of RIEs:
  detecting an anomalous event exhibited by the set of AGIs restored in the RIE;
  assessing the anomalous event to identify a cyber threat root; and
  generating a cyber threat solution based at least in part on the cyber threat root.

8. The method of claim 7, further comprising:
for each cyber threat solution of a set of cyber threat solutions generated as a result of monitoring the first set of RIEs:
  generating a threat intelligence report comprising at least the cyber threat solution; and
  transmitting the threat intelligence report to at least one production system of the set of production systems.

9. A disaster recovery platform (DRP), comprising:
a computer processor;
memory and a data repository coupled to the computer processor; and
a threat intelligence service (TIS) executing on the computer processor,
wherein the DRP, using the TIS at least in part, is programmed to:
  for each production system of a set of production systems operatively connected to the DRP:
    receive a set of application granularity images (AGIs) for at least one application executing on the production system;
    store, for backup and archiving, the set of AGIs in the data repository;
    obtain a cyber protection configuration (CPC) associated with the production system;
    select, based on the CPC, the set of AGIs from the data repository;
    instantiate a restored image environment (RIE) in a cloud computing network;
    configure the RIE by restoring the set of AGIs in the RIE; and
    create an environment manager to probe the RIE in search for one selected from a group consisting of potential threat signatures (PTSs) and anomalous events.

10. The DRP of claim 9,
wherein the TIS comprises a set of environment managers,
wherein the set of environment managers comprises the environment manager monitoring the RIE instantiated for each production system of the set of production systems.

11. The DRP of claim 9, wherein the set of AGIs represents one selected from a group consisting of a computer process, an application comprising a plurality of computer processes, and a plurality of applications comprising a plurality of mutually exclusive sets of computer processes.

12. A non-transitory computer readable medium (CRM) comprising computer readable program code, which when executed by a computer processor residing on a disaster recovery platform (DRP), enables the DRP to:
for each production system of a set of production systems operatively connected to the DRP:
  receive a set of application granularity images (AGIs) for at least one application executing on the production system;
  store, for backup and archiving, the set of AGIs in a data repository;
  obtain a cyber protection configuration (CPC) associated with the production system;
  select, based on the CPC, the set of AGIs from the data repository;
  instantiate a restored image environment (RIE) in a cloud computing network;
  configure the RIE by restoring the set of AGIs in the RIE; and
  create an environment manager to probe the RIE in search for one selected from a group consisting of potential threat signatures (PTSs) and anomalous events.

13. The non-transitory CRM of claim 12, wherein the CPC comprises a set of parameters outlining at least one threat intelligence test, wherein the set of parameters specify at least the set of AGIs for the at least one application.

14. The non-transitory CRM of claim 12, comprising computer readable program code, which when executed by the computer processor, further enables the DRP to:
for each RIE of a first set of RIEs:
  identify a PTS exhibited by the set of AGIs restored in the RIE;
  match the PTS to one known cyber threat signature of a set of known cyber threat signatures; and
  issue, in response to the matching, a PTS notification comprising at least the PTS.

15. The non-transitory CRM of claim 14, wherein the first set of RIEs is a subset of a second set of RIEs, wherein the second set of RIEs comprises one RIE for each production system of the set of production systems.

16. The non-transitory CRM of claim 14, comprising computer readable program code, which when executed by the computer processor, further enables the DRP to:
for each PTS notification of a set of PTS notifications issued as a result of monitoring the first set of RIEs:
  generate a threat intelligence report comprising at least the PTS disclosed in the PTS notification; and
  transmit the threat intelligence report to a recipient production system,
  wherein the recipient production system is one production system in a subset of production systems of the set of production systems,
  wherein each production system of the subset of production systems is associated with the set of AGIs restored in one RIE of the first set of RIEs.

17. The non-transitory CRM of claim 14, comprising computer readable program code, which when executed by the computer processor, further enables the DRP to:
using a set of PTS notifications issued as a result of monitoring the first set of RIEs:
  obtain a first PTS enclosed in a first PTS notification of the set of PTS notifications;
  obtain a second PTS enclosed in a second PTS notification of the set of PTS notifications;
  determine that the first PTS matches the second PTS;
  generate, based on the determining, a threat intelligence report comprising at least the first PTS; and
  transmit the threat intelligence report to all production systems in the set of production systems.

18. The non-transitory CRM of claim 12, comprising computer readable program code, which when executed by the computer processor, further enables the DRP to:
for each RIE of a first set of RIEs:
  detect an anomalous event exhibited by the set of AGIs restored in the RIE;
  assess the anomalous event to identify a cyber threat root; and generate a cyber threat solution based at least in part on the cyber threat root.

19. The non-transitory CRM of claim 18, comprising computer readable program code, which when executed by the computer processor, further enables the DRP to:
for each cyber threat solution of a set of cyber threat solutions generated as a result of monitoring the first set of RIEs:
generate a threat intelligence report comprising at least the cyber threat solution; and
transmit the threat intelligence report to at least one production system of the set of production systems.

* * * * *